United States Patent
Ikkink et al.

(10) Patent No.: US 8,862,422 B2
(45) Date of Patent: Oct. 14, 2014

(54) SENSOR FOR SENSING ACCELERATIONS

(75) Inventors: Teunis Ikkink, Geldrop (NL); Hans Boeve, Hechtel-Eksel (BE)

(73) Assignee: NXP B.V., Eindhoven (NL)

( * ) Notice: Subject to any disclaimer, the term of this patent is extended or adjusted under 35 U.S.C. 154(b) by 1043 days.

(21) Appl. No.: 12/306,041

(22) PCT Filed: May 25, 2007

(86) PCT No.: PCT/IB2007/051978
§ 371 (c)(1),
(2), (4) Date: Jul. 17, 2009

(87) PCT Pub. No.: WO2007/148246
PCT Pub. Date: Dec. 27, 2007

(65) Prior Publication Data
US 2010/0010771 A1    Jan. 14, 2010

(30) Foreign Application Priority Data
Jun. 21, 2006    (EP) .................................... 06115774

(51) Int. Cl.
G01P 15/08    (2006.01)
G01P 15/18    (2013.01)
G11B 19/04    (2006.01)

(52) U.S. Cl.
CPC ............ *G01P 15/0891* (2013.01); *G01P 15/18* (2013.01); *G11B 19/043* (2013.01)
USPC .......................................... 702/104; 702/141

(58) Field of Classification Search
CPC ............................. G01P 15/0891; G01P 15/18
USPC ............ 702/160, 149, 150, 141, 142, 79, 78, 702/189, 190, 194, 199; 324/200, 207.11, 324/207.23; 73/490, 510, 382 G, 382 R, 489, 73/492, 504.03, 514.01, 514.02, 514.15; 235/105, 95 R, 96, 97, 95 A, 95 C; 701/207

See application file for complete search history.

(56) References Cited

U.S. PATENT DOCUMENTS

| | | | |
|---|---|---|---|
| 6,046,877 A | 4/2000 | Kelsic | |
| 6,369,706 B1 | 4/2002 | Anderson et al. | |
| 6,392,584 B1 * | 5/2002 | Eklund | 341/183 |
| 7,369,345 B1 * | 5/2008 | Li et al. | 360/75 |
| 7,474,970 B2 * | 1/2009 | Miyoshi et al. | 702/56 |

(Continued)

FOREIGN PATENT DOCUMENTS

| | | |
|---|---|---|
| EP | 1612565 A2 | 4/2006 |
| GB | 2416036 A | 11/2006 |
| JP | 2005346840 A | 12/2005 |

*Primary Examiner* — Sujoy Kundu
*Assistant Examiner* — Ricky Ngon

(57) ABSTRACT

Sensors (1) for sensing accelerations are provided with accelerometers (11) for measuring accelerations, with magnetometers (12) for measuring magnetic fields, and with processors (13) for, in response to acceleration measurements and magnetic field measurements, judging the accelerations. The processors (13) may comprise acceleration units (14) for comparing acceleration signals with acceleration thresholds, and magnetic field units (15) for comparing changes of magnetic field signals per time interval with rate thresholds. The processors (13) may further comprise decision units (17) for, in response to comparison results from the acceleration units (14) and the magnetic field units (15), deciding whether a total acceleration forms part of a tumbling free-fall or a non-tumbling free-fall or not. The processors (13) may yet further comprise distinguishing units (18) and control units (19). Devices (2) may comprise sensors (1).

11 Claims, 2 Drawing Sheets

(56) References Cited

U.S. PATENT DOCUMENTS

| | | | |
|---|---|---|---|
| 7,587,277 B1 * | 9/2009 | Wells | 701/220 |
| 7,872,827 B2 * | 1/2011 | Shu et al. | 360/75 |
| 2007/0030587 A1 * | 2/2007 | Noda et al. | 360/75 |
| 2007/0107068 A1 * | 5/2007 | Kelley et al. | 726/34 |
| 2007/0296571 A1 * | 12/2007 | Kolen | 340/539.11 |
| 2008/0234935 A1 * | 9/2008 | Wolf et al. | 701/216 |

* cited by examiner

SENSOR FOR SENSING ACCELERATIONS

FIELD OF THE INVENTION

The invention relates to a sensor for sensing accelerations, and also relates to a device comprising a sensor, to a method, to a computer program product and to a medium.

Examples of such a sensor are free-fall detectors, and examples of such a device are consumer products and non-consumer products.

BACKGROUND OF THE INVENTION

EP 1 612 565 A2 discloses a free-fall detection device and free-fall protection system for a portable electronic apparatus.

This device is disadvantageous, inter alia, owing to the fact that, as described in lines 50-54 of column 7 of EP 1 612 565 A2, its accelerometer is preferably to be mounted close to the center of mass of the portable electronic apparatus, to reduce any centripetal acceleration, if the apparatus rotates during the free-fall.

SUMMARY OF THE INVENTION

It is an object of the invention, inter alia, to provide a more all-round sensor for sensing accelerations.

Further objects of the invention are, inter alia, to provide a device comprising a more all-round sensor, a method, a computer program product and a medium.

The sensor according to the invention for sensing accelerations comprises:

an accelerometer for measuring an acceleration, a magnetometer for measuring a magnetic field, and a processor for, in response to at least one acceleration measurement and at least one magnetic field measurement, judging the acceleration.

By using a combination of the accelerometer and the magnetometer, and by letting the processor use one or more acceleration measurements as well as one or more magnetic field measurements, this processor is capable of judging the acceleration. As a result, one or more measurements and one or more judgments are available, that make the sensor more all-round. For example in case of the sensor being mounted relatively far away from the center of mass of the device, a centripetal acceleration may occur, if the device rotates during the free-fall, but the measurements and the judgments of the more all-round sensor will detect this. For example in case of the device not rotating during the free-fall, a centripetal acceleration does not need to occur, but the measurements and the judgments of the more all-round sensor will still improve the performance of the sensor, owing to the fact that more information will be available.

The sensor according to the invention is further advantageous, inter alia, in that its improved performance will result in a better protection of a device comprising such a sensor.

An embodiment of the sensor according to the invention is defined by the accelerometer comprising an at least two dimensional accelerometer for measuring the acceleration in at least two dimensions and for generating at least two acceleration signals per acceleration measurement. These at least two acceleration signals per acceleration measurement describe an acceleration relatively completely. A dimension may be an axis. The at least two dimensional accelerometer may for example be a two dimensional accelerometer or a part of a three dimensional accelerometer or a three dimensional accelerometer, without excluding further options. The accelerometer may in addition comprise a further one, two or three dimensional accelerometer.

An embodiment of the sensor according to the invention is defined by the magnetometer comprising an at least two dimensional magnetometer for measuring the magnetic field in at least two dimensions and for generating at least two magnetic field signals per magnetic field measurement. These at least two magnetic field signals per magnetic field measurement describe a magnetic field such as the earth magnetic field or an artificially generated magnetic field relatively completely. A dimension may be an axis. The at least two dimensional magnetometer may for example be a two dimensional magnetometer or a part of a three dimensional magnetometer or a three dimensional magnetometer, without excluding further options. The magnetometer may in addition comprise a further one, two or three dimensional magnetometer.

So, in more general terms, possible combinations might be 3D g+3D B, 3D g+2D B, 2D g+3D B and 2D g+2D B. The fact that the magnetometer does not need to be a three dimensional magnetometer but can be a two dimensional magnetometer is a great advantage, owing to the fact that two dimensional magnetometers can be produced easier and at lower costs and can be made durable and of a smaller size. For free-fall applications, a three dimensional accelerometer is to be preferred.

An embodiment of the sensor according to the invention is defined by the processor comprising:

an acceleration unit for comparing at least one acceleration signal with at least one acceleration threshold, and a magnetic field unit for comparing at least one change of at least one magnetic field signal per time interval with at least one rate threshold.

The comparison of one or more acceleration signals with one or more acceleration thresholds and the comparison of one or more changes of one or more magnetic field signals per time interval with one or more rate (of change) thresholds result in relatively high quality judgments.

An embodiment of the sensor according to the invention is defined by the processor further comprising:

a decision unit for, in response to comparison results from the acceleration unit and the magnetic field unit, deciding whether a total acceleration forms part of a tumbling free-fall or a non-tumbling free-fall or not.

According to this embodiment, the judgment of the acceleration comprises a decision of whether the total acceleration forms part of the tumbling free-fall or the non-tumbling free-fall or not.

An embodiment of the sensor according to the invention is defined by the processor further comprising:

a distinguishing unit for, in response to comparison results from the acceleration unit and the magnetic field unit, distinguishing a first acceleration in a first direction from a second acceleration in a second direction, and a decision unit for, in response to comparison results from the acceleration unit and the magnetic field unit, deciding whether at least one of the first and second accelerations forms part of a tumbling free-fall or a non-tumbling free-fall or not.

According to this embodiment, the judgment of the acceleration comprises a decision of whether one or more of the first and second accelerations form part of the tumbling free-fall or the non-tumbling free-fall or not. The distinguishing unit for example comprises a filter such as a Kalman filter, without excluding other kinds of filters and other kinds of units.

An embodiment of the sensor according to the invention is defined by the processor further comprising:

a control unit for, in response to at least one comparison result from the acceleration unit and/or the magnetic field unit, controlling a clock signal generator for generating a variable clock signal defining a variable bandwidth rate and/or a variable sampling rate.

According to this embodiment, the judgment of the acceleration comprises a control of the clock signal generator. For example in case of one or more comparison results pointing into a direction of a possible tumbling free-fall or a possible non-tumbling free-fall, the clock signal may be increased to let the sensor do its job at an increased bandwidth and/or increased sampling rate. For example in case of one or more comparison results pointing away from a direction of a possible tumbling free-fall or a possible non-tumbling free-fall, the clock signal may be decreased to let the sensor do its job at a decreased bandwidth and/or decreased sampling rate etc.

Embodiments of the device according to the invention and of the method according to the invention and of the computer program product according to the invention and of the medium according to the invention correspond with the embodiments of the sensor according to the invention. The device for example further comprises a hard-disk or another part that is sensitive to shocks and/or impacts and/or jumps in acceleration values. The computer program product performs the steps of the method or alternatively performs functions corresponding to the steps of the method. The medium for example comprises a disk or a stick or a hard-disk or another kind of memory.

The invention is based upon an insight, inter alia, that an accelerometer only measures an acceleration, and is based upon a basic idea, inter alia, that a combination of an accelerometer for measuring an acceleration and a magnetometer for measuring a magnetic field makes the sensor more all-round.

The invention solves the problem, inter alia, to provide a more all-round sensor for sensing accelerations. The sensor according to the invention is further advantageous, inter alia, in that its improved performance will result in a better protection of a device comprising such a sensor.

These and other aspects of the invention will be apparent from and elucidated with reference to the embodiments(s) described hereinafter.

DETAILED DESCRIPTION OF EMBODIMENTS

Figure 1:
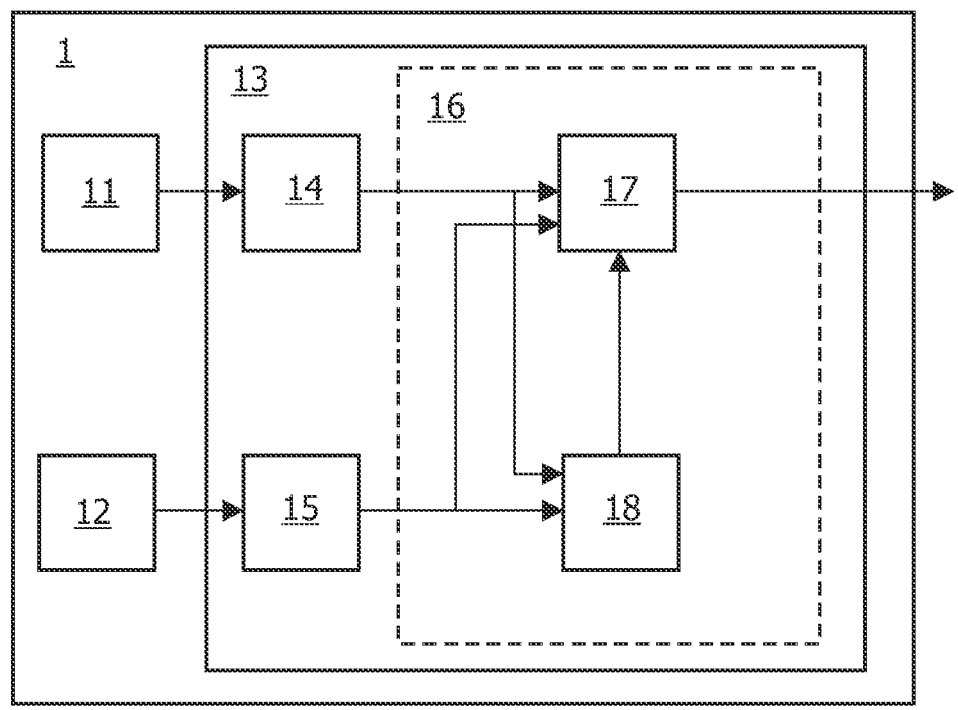
FIG. 1 shows diagrammatically a sensor according to the invention.

The sensor 1 shown in the FIG. 1 comprises an accelerometer 11 for measuring an acceleration, a magnetometer 12 for measuring a magnetic field, and a processor 13 for, in response to at least one acceleration measurement and at least one magnetic field measurement, judging the acceleration. Thereto, outputs of the meters 11 and 12 are coupled to inputs of the processor 13. The acceleration is for example the acceleration of a device 2 comprising the sensor 1, which device 2 is described via the FIG. 2. Alternatively, the acceleration may be the acceleration of a human being carrying the sensor or the acceleration of a device in the form of a vehicle, whereby further equipment may be present coupled to an output of the sensor in a wired and/or wireless way. In response to one or more judgments, the further equipment may take action, like generating a warning signal, making a call, sensing a fax or a message or an email etc.

The accelerometer 11 for example comprises an at least two dimensional accelerometer for measuring the acceleration in for example at least two dimensions and for generating for example at least two acceleration signals per acceleration measurement. These at least two acceleration signals may be supplied to the processor 13 via a serial coupling or via parallel couplings. An interface can be analog or digital. Analog-to-digital conversion can be done in the accelerometer 11 or in the processor 13. In the first case, a digital interface may include I2C and/or SPI.

The magnetometer 12 for example comprises an at least two dimensional magnetometer for measuring the magnetic field in for example at least two dimensions and for generating for example at least two magnetic field signals per magnetic field measurement. These at least two magnetic field signals may be supplied to the processor 13 via a serial coupling or via parallel couplings. An interface can be analog or digital. Analog-to-digital conversion can be done in the magnetometer 12 or in the processor 13. In the first case, a digital interface may include I2C and/or SPI.

For free-fall applications, a three dimensional accelerometer is to be preferred, without excluding a two dimensional accelerometer. The magnetometer can be a three dimensional magnetometer but does not need to be a three dimensional magnetometer and can be a two dimensional magnetometer too, which is a great advantage, owing to the fact that two dimensional magnetometers can be produced easier and at lower costs and can be more durable and of a smaller size.

The processor 13 for example comprises an acceleration unit 14 for comparing at least one acceleration signal originating from the accelerometer 11 with at least one acceleration threshold, and a magnetic field unit 15 for comparing at least one change of at least one magnetic field signal originating from the magnetometer 12 per time interval with at least one rate threshold. Thereto, inputs of these units 14 and 15 are coupled to and/or form the inputs of the processor 13.

The processor 13 may for example further comprise a decision unit 17 for, in response to comparison results from the acceleration unit 14 and the magnetic field unit 15, deciding whether a total acceleration forms part of a tumbling free-fall or a non-tumbling free-fall or not. Thereto, outputs of the units 14 and 15 are coupled to inputs of the unit 17.

Alternatively, the processor 13 may further comprise a distinguishing unit 18 such as a filter for, in response to comparison results from the acceleration unit 14 and the magnetic field unit 15, distinguishing a first acceleration in a first direction from a second acceleration in a second direction, and a decision unit 17 for, in response to comparison results from the acceleration unit 14 and the magnetic field unit 15, deciding whether at least one of the first and second accelerations forms part of a tumbling free-fall or a non-tumbling free-fall or not. Thereto, outputs of the units 14 and 15 are coupled to inputs of the unit 17 and to inputs of the unit 18, and an output of the unit 18 is coupled to a further input of the unit 17.

Figure 2:
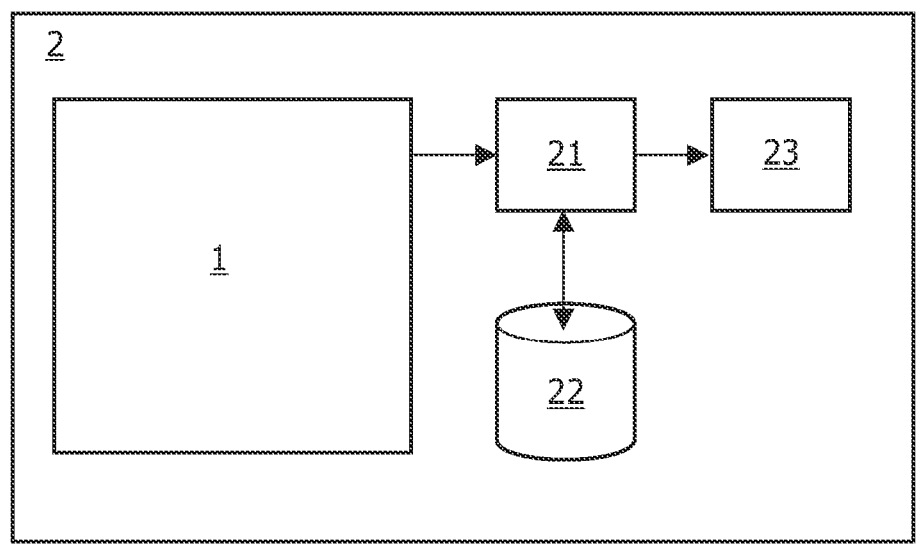
FIG. 2 shows diagrammatically a device according to the invention comprising the sensor according to the invention.

The device 2 shown in the FIG. 2 comprises the sensor 1 already described for the FIG. 1 and further comprises for example a device processor 21, a memory 22 and an output interface 23. In that case, an input of the device processor 21 is coupled to an output of (the decision unit 17 of) the processor 13, an in/output of the device processor 21 is coupled to an in/output of the memory 22 and an output of the device processor 21 is coupled to an input of the output interface 23. The output interface 23 for example comprises a display and/or a loudspeaker in case of the device 2 being a MP3 player or a mobile phone.

Figure 3:
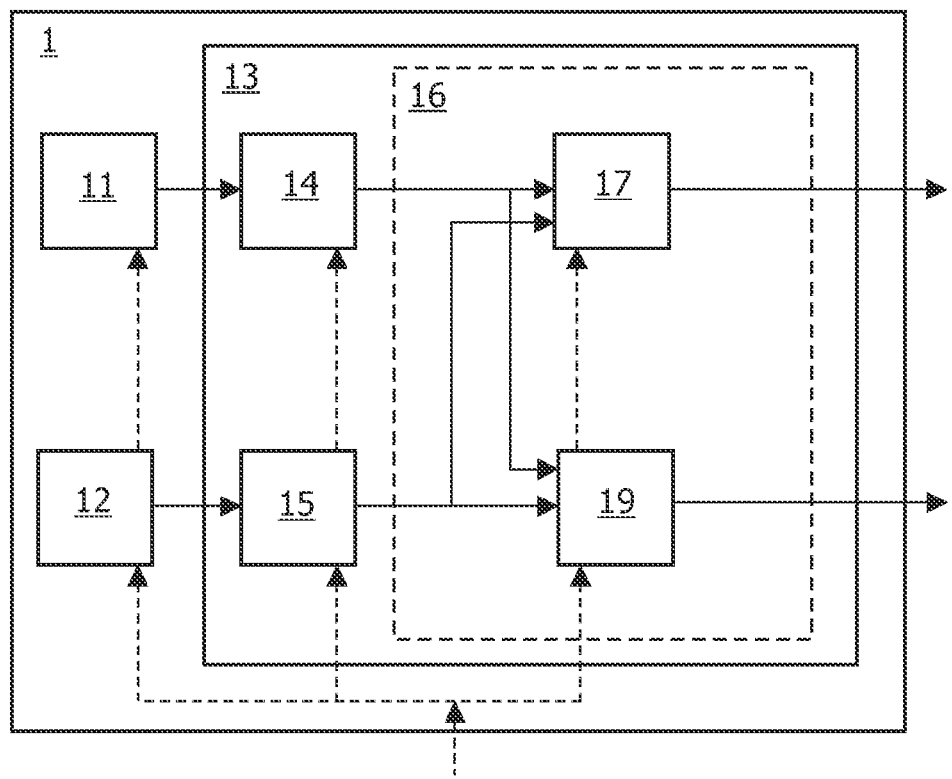
FIG. 3 shows diagrammatically a further sensor according to the invention.

The sensor 1 shown in the FIG. 3 corresponds with the one already described for the FIG. 1, apart from the fact that the distinguishing unit 18 has been replaced by a control unit 19 for, in response to at least one comparison result from the acceleration unit 14 and/or the magnetic field unit 15, controlling a clock signal generator 24 for generating a variable clock signal defining a variable bandwidth rate and/or a variable sampling rate. Thereto, outputs of the units 14 and 15 are coupled to inputs of the unit 19 and an output of the unit 19 is coupled to an input of the clock signal generator 24 further described via the FIG. 4.

Figure 4:
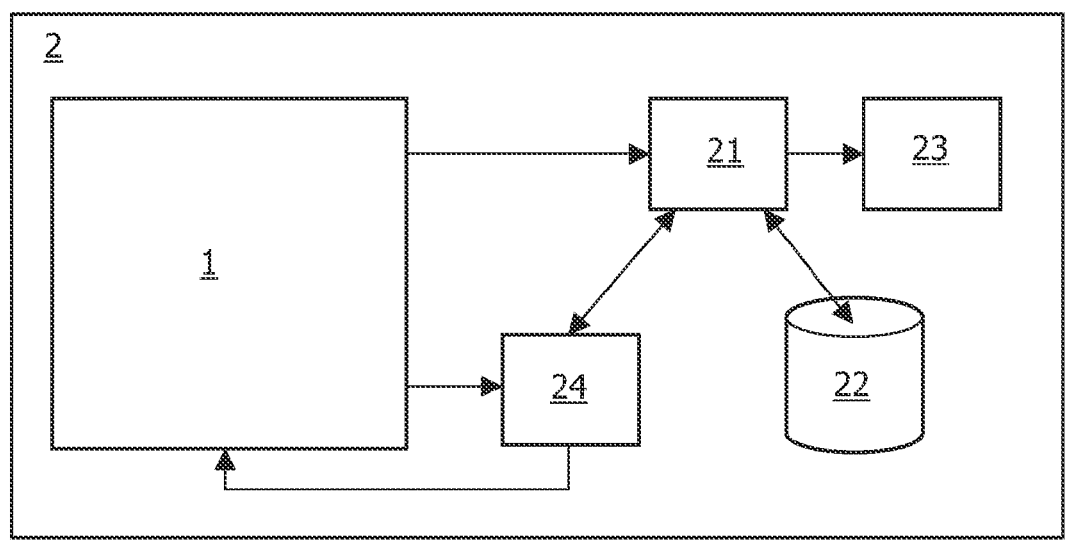
FIG. 4 shows diagrammatically a further device according to the invention comprising the further sensor according to the invention.

The device 2 shown in the FIG. 4 corresponds with the one already described for the FIG. 3, apart from the fact that it further comprises the clock signal generator 24. In this case, a further in/output of the device processor 21 is coupled to an in/output of the clock signal generator 24 and an output of the clock signal generator 24 is fed back to a clock signal input of the sensor 1. In the FIG. 3, dashed arrows indicate the supply of the clock signals.

In the processor 13, the units 14 and 15 may be considered to be data interfacing units and the units 17-19 may be considered to be data processing units. In that case, the processor 13 comprises an interfacing part comprising the units 14 and 15 and a processing part 16 comprising the units 17-19. The interfacing part for example has comparison tasks and/or threshold tasks, and the processing part 16 for example has decision tasks and/or differentiation tasks and/or control tasks without excluding further tasks.

So, the judgment of the acceleration may for example comprise a decision of whether a total acceleration such a root mean square of accelerations in two or three directions forms part of the tumbling free-fall or the non-tumbling free-fall or not, and/or may for example comprise a decision of whether one or more of the accelerations in two or three directions form part of the tumbling free-fall or the non-tumbling free-fall or not. Alternatively, the judgment of the acceleration may comprise a control of the clock signal generator, to increase the clock signal for example in case of one or more comparison results pointing into a direction of a possible tumbling free-fall or a possible non-tumbling free-fall, to give the sensor an increased bandwidth and/or increased sampling rate etc. for example to increase an accuracy. Or, the judgment of the acceleration may comprise a control of the clock signal generator, to decrease the clock signal for example in case of one or more comparison results pointing away from a direction of a possible tumbling free-fall or a possible non-tumbling free-fall, to give the sensor a decreased bandwidth and/or decreased sampling rate etc. for example to reduce the power consumption.

The sensor 1 for example protects the memory 22 such as a hard-disk or another kind of disk or a stick etc. against shocks and/or impacts and/or jumps in acceleration values that for example result from a free-fall of the device 2. As soon as the sensor is detecting a possible free-fall, the memory 22 can be brought into a protected mode. The sensor 1 may protect other parts of the device 2 as well and/or alternatively, such as the device processor 21 and/or the output interface 23 etc.

Each unit 14, 15, 17-19 may be 100% hardware, 100% software or a mixture of both. Each unit 14, 15, 17-19 may be divided into two or more sub-units, and two or more of the units 14, 15, 17-19 may be combined into one larger unit. The respective units 14 and 15 may partly or entirely be shifted into the respective meters 11 and 12. The processor 13 may partly or entirely be combined with the device processor 21. The clock signal generator 24 may partly or entirely be shifted into the sensor 1. Although in the FIG. 3 each meter 11 and 12 and each unit 14, 15, 17-19 have got a (hardware and/or software) clock input, in practice one or more meters and/or one or more units may function without such a clock input.

So, a magnetometer 12 is added to the accelerometer 11. The magnetometer 12 for example measures the earth's magnetic field. In an attitude sensing system the accelerometer 11 and magnetometer 12 together provide sufficient information to allow determination of the attitude of the device 2. In a situation of a tumbling free-fall the accuracy of the orientation sensing function may be substantially poorer than during quasi-static attitude sensing for which it is designed. Nevertheless, although the accuracy of dynamic attitude determination is subject to limitations, tumbling motion will produce changes in the magnetometer output signal, since the orientation of the magnetometer 12 w.r.t. the earth's magnetic field is likely to change dynamically when spinning.

To detect the majority of tumbling free-falls in an earlier stage, it is proposed, inter alia, to look for changes in the magnetometer signals when the acceleration is outside a predetermined window around 1 g. If the total acceleration is outside this window and if at least one of the magnetometer signals changes at a rate higher than a predetermined threshold rate, the situation may be classified as a tumbling free-fall. If the total acceleration is outside the window but none of the magnetometer signals changes sufficiently fast, the time spent outside the acceleration window may be examined.

An advantage of including a magnetometer 12 and examining its signal changes is that tumbling free-fall situations can be detected in an earlier stage than possible when using the accelerometer 11 alone. Such an improvement of response time is beneficial especially for drops from relatively low heights in which the available time budget is relatively limited. The approach to use the magnetometer signals to decrease the response time for the case of tumbling motion is described in example I.

Also if the motion of the device 2 does not involve spinning, adding the magnetometer 12 can increase the reliability of a (free-fall) sensor 1. Example II describes how horizontal external accelerations can be discerned from vertical external accelerations. This allows a reduction of false-positive detection rates.

A related but independent benefit may be that a free-fall pre-detection can use the magnetometer signals in addition to the accelerometer signals. This is to decide whether the detection system should switch to a high-bandwidth (power-hungry) detection mode. The use as free-fall pre-detection is described in example III.

Example I

This example aims at decreasing the response time in case the device 2 is in a tumbling (spinning) free-fall. The detection criterion is the presence of a significant external acceleration (detected as a deviation from 1 g of the RMS sum of the three accelerometer signals) and a sufficient high rate of change of the magnetometer signals. Once the device 2 is falling, by approximation no external forces (or torques) are acting on the device 2. Hence the orientation of the spin axis is constant both in a body-fixed coordinate system as well as in an earth-fixed reference coordinate system.

The rate of change of the signal from a particular magnetometer axis in the case of spinning depends on the orientation of the spin axis w.r.t. a) the orientation of the magnetometer sensitivity axis and b) the orientation of earth's magnetic field vector, in case the earth's magnetic field is used as a reference. No signal change will be observed if the spin axis is parallel to either of these two directions. In the first case another magnetometer axis, oriented differently in the body-fixed coordinate system, will give a signal change, whereas in the first case none of the magnetometer axes will give a signal change. Thus signals changes will be seen in any of the magnetometer axes if the spin axis is not parallel to the earth's magnetic field vector.

The spin axis of a falling object is usually oriented horizontally, because of the torques exerted on the body just before it dropped. The forces normally holding an object have to resist gravity and thus are oriented vertically. Just before the object is dropped, gravity is pulling the centre of mass of the object down whereas the vertical upward holding force is exerted on another part of the object. Hence the two vertical forces exert a horizontal torque on the body, resulting in a horizontally directed angular momentum (or spin axis) once the object is in a free-fall. An example is the case where the object drops off a table.

With the exception of the region around the equator, the earth's magnetic field has a significant vertical component at most locations on the earth. Hence a horizontal spin axis is unlikely to be parallel to the earth's magnetic field. Even at the equator the spin axis would have to be in the north-south direction to see no signal changes in the magnetometer. The rate of change of a particular magnetometer signal mounted to a spinning object varies according to $$S(t) = M(t) \cdot B \quad (1)$$

where $S(t)$ is the signal observed in the magnetometer axis, $M(t)$ is the sensitivity vector of the particular magnetometer axis (changes with time due to spinning) and $B$ is the earth magnetic field vector. The observed signal is the perpendicular projection (i.e. dot-product) of the field onto the sensitivity axis. The sensitivity vector $M(t)$ rotates about a spin axis $\Omega$ (a unity-length vector). If we denote the sensitivity vector at time $t=0$ by $M_0$, and the spin angle by $\alpha(t)=\omega t$, where $\omega$ represents the spin rate, then the sensitivity vector $M(t)$ varies as $$M(t) = (M_0 \cdot \Omega) \cdot \Omega - \sin\alpha(t) \cdot (M_0 \times \Omega) - \cos\alpha(t) \cdot ((M_0 \times \Omega) \times \Omega) \quad (2)$$

Eq. (2) is based on Rodrigues' rotation formula. The instantaneous sensitivity vector $M(t)$ consists of three terms: one constant term is parallel to the spin axis $\Omega$, a second term varying with $\sin\alpha$ is perpendicular to both the initial sensitivity vector $M_0$ and the spin axis $\Omega$, and a third term, varying with $\cos\alpha$, is in the plane containing $M_0$ and $\Omega$, but perpendicular to $\Omega$.

The time-varying part of the sensitivity vector is given by the last two terms of eq. (2). If the time-varying part of eq. (2) is substituted in eq. (1) the time-varying part of the magnetometer signal is got:

$$S_{AC}(t) = -\sin\alpha(t) \cdot (M_0 \times \Omega) \cdot B - \cos\alpha(t) \cdot ((M_0 \times \Omega) \times \Omega) \cdot B \quad (3)$$

The dot-products with $B$ in both terms can be worked out, yielding $$S_{AC}(t) = \sin\alpha(t) \cdot M_0 \cdot (B \times \Omega) + \cos\alpha(t) \cdot (M_0 \times \Omega) \cdot (B \times \Omega) \quad (4)$$

This shows that the magnitude of the magnetometer signal variation is proportional to the cross-product of the spin axis and the earth magnetic field (parallel->no signal variation; perpendicular->maximum signal variation). The maximum rate of change is achieved for that spin angle $\alpha_{max}$ which gives $S_{AC}(t)=0$:

$$\tan\alpha_{max} = -\frac{(M_0 \times \Omega) \cdot (B \times \Omega)}{M_0 \cdot (B \times \Omega)} \quad (5)$$

The corresponding maximum rate of change is given by $$\left.\frac{\partial S_{AC}}{\partial t}\right|_{max} = \omega(\cos\alpha_{max} \cdot M_0 \cdot (B \times \Omega) - \sin\alpha_{max} \cdot (M_0 \times \Omega) \cdot (B \times \Omega)) \quad (6)$$

$$= \omega\sqrt{((M_0 \times \Omega) \cdot (B \times \Omega))^2 + (M_0 \cdot (B \times \Omega))^2}$$

In the case where the cross-product $B \times \Omega$ is significant (i.e. spin axis sufficiently perpendicular to the earth magnetic field), comparing the rate of change of the magnetometer signal to a predefined threshold, will give a good indication whether the spinning motion of the device is alarming.

Eq. (6) can also be written as $$\left.\frac{\partial S_{AC}}{\partial t}\right|_{max} = \omega\sqrt{((M_0 \times \Omega) \cdot (B \times \Omega))^2 + ((M_0 \times \Omega) \cdot B)^2} \quad (7)$$

This shows that if the spin axis is parallel to the magnetometer sensitivity vector, there will be no variation in the signal of that magnetometer. Fortunately, since the magnetometer has at least one additional axis, oriented perpendicularly to the first magnetometer axis, this second (and possibly third) magnetometer axis will be perpendicular to the spin axis and thus produce the maximum rate of change. Hence all magnetometer axes are preferably to be monitored individually and simultaneously to determine whether the device is spinning at an alarming rate.

As argued before, the likely spin axis is essentially horizontal. If the inclination angle of the earth magnetic field is $\phi_i$, then the angle $\theta$ between the spin axis and the magnetic field is bounded as follows:

$$|\phi_i| \leq \theta \leq 90° \quad (8)$$

The lower bound is reached if the spin axis is oriented along the north-south direction, whereas 90° is reached when the spin axis is oriented east-west. The cross product $B \times \Omega$ is proportional to $\sin\theta$. Hence for an inclination angle of $\pm 30°$ (reached at latitudes roughly $\pm 20°$ from the equator) the spin rate that would make the magnetometer signal rate of change exceed the predetermined threshold could vary by a factor of two. For larger inclination angles (corresponding to locations further away from the equator) this variation in critical spin rate would be less.

When the rate of change of any of the available magnetometer signals exceeds a predefined threshold, and if at the same time the magnitude of the total acceleration, determined as the RMS sum of the accelerometer signals, deviates more than another predetermined threshold from 1 g, then the situation is immediately classified as a (tumbling) free-fall.

If the total acceleration deviates from 1 g by more than the predefined threshold, but the rate of change on none of the magnetometer signals does, then the time integral of the acceleration deviation over the most recent time interval of duration Δt has to be monitored for exceeding yet another threshold:

$$\int_{t-\Delta t}^{t} \sqrt{|a_{total}^2 - g^2|}\, dt \stackrel{?}{>} \text{threshold} \quad (9)$$

If this threshold is exceeded, the device motion is classified as a non-tumbling free-fall.

Example II

This example uses model errors in for example a Kalman filter to estimate an external acceleration. In this example a technique for dynamic state estimation (such as Kalman filtering) is applied to estimate the attitude of the device 2. This example gives lower false-positive detection rates, also if the device motion does not involve spinning.

The Kalman filter is an iterative algorithm that estimates a state vector. From the estimated state (i.e. attitude) at the current sampling instant it predicts the sensor signals for the next sampling instant. This prediction calculation uses the known vector representation of the earth's gravitational and magnetic field vectors in a reference coordinate frame. The sensor signal vector predicted for the current sampling instant is compared to the measured sensor signal vector at the current sampling instant and their difference is formed. This difference vector (error vector) is used to update (correct) the state estimate for the current sampling instant.

The error vector deviates from zero due to sensor noise, model errors and attitude changes over time. Since the used model usually covers only the quasi-static situation (i.e. no accelerations), any external acceleration will results in model errors, which will show up as an increase of the error vector (in fact an increase of the error covariance matrix; the error covariance matrix measures the second-order statistical moments of the error vector). The model error is a result of the fact that the measured sensor signal vector cannot be fitted very well anymore to the model of the earth's gravitational and magnetic field vectors. An increase of the coefficients of the error covariance matrix is a clear indication of external acceleration, possibly due to a free-fall. The external acceleration (being those components of the error vector that correspond to the accelerometer signals) can be transformed back into the reference coordinate system using the attitude estimated by the Kalman filter. If the back-transformed external acceleration has a vertical component that is directed downward we might be in a free-fall situation. To make the final decision, the estimated vertical external acceleration is integrated over a fixed but moving time interval (e.g. over the most recent 50 ms). When this integral exceeds some predetermined limit, it may be decided that the device 2 is in a free-fall situation.

In this example the magnitude and direction of the external acceleration are estimated, preferably alone and separated from the gravitational acceleration. This information may be more detailed than the magnitude of the total acceleration. Furthermore, since the attitude of the device 2 is also estimated, even the direction of the external acceleration in the reference coordinate frame can be estimated and it can be examined whether it has a sufficiently large downward vertical component to justify a classification as a free-fall. Since horizontal accelerations (which should usually not be classified as free-fall) can be distinguished from vertical accelerations (which should possibly be classified as free-fall), this method gives lower false-positive detection, also in the case where there is no spinning motion.

Example III

For example in order to save power in mobile devices the bandwidth and sampling rate for normal usage are chosen as low as possible from a performance viewpoint. For an orientation sensor whose normal use is compassing and pointing, typical bandwidths can be in the range from 10 Hz to 100 Hz. Since a free fall typically takes in the order of 100 ms, the bandwidth and sampling rates should be geared up to several hundred Hz within a few ms after a suspicious situation is detected. Discerning suspicious situations from normal situations is the task of a sensor 1 operating as a pre-detector.

The pre-detector should preferably be simple, sensitive and fast. It is allowed to have a relatively high false positive rate but it should definitely have a low false negative rate. In other words, it should be capable of marking almost all true free-fall situations as 'suspicious' while it is allowed to also mark a relatively significant number of true normal situations as "suspicious". The pre-detection function monitors the signals from the accelerometer 11 and the magnetometer 12 for anomalies. The pre-detector should respond whenever an anomaly in any of the signals or in an appropriate function of these signals is observed. Anomalies may include for example sudden changes in any of the individual accelerometers signals; RMS sum of the accelerometer signals outside window around 1 g; and high rate of change in any of the magnetometer signals.

Within a mobile phone environment, the pre-detector response may further lead to additional measures, e.g. an alert signal may be created to allow for a high-priority baseband process supporting free fall detection at higher bandwidth that ultimately results in hard disk protection. Less critical processes may be placed on hold or even interrupted, whereas first measures to safely park the hard disk can be taken. To give an example, a read or write procedure can be interrupted, so that in the case of a free fall situation, the system can take immediate protective action.

Summarizing, sensors 1 for sensing accelerations are provided with accelerometers 11 for measuring accelerations, with magnetometers 12 for measuring magnetic fields, and with processors 13 for, in response to acceleration measurements and magnetic field measurements, judging the accelerations. The processors 13 may comprise acceleration units 14 for comparing acceleration signals with acceleration thresholds, and magnetic field units 15 for comparing changes of magnetic field signals per time interval with rate thresholds. The processors 13 may further comprise decision units 17 for, in response to comparison results from the acceleration units 14 and the magnetic field units 15, deciding whether a total acceleration forms part of a tumbling free-fall or a non-tumbling free-fall or not. The processors 13 may yet further comprise distinguishing units 18 and control units 19. Devices 2 may comprise sensors 1.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A sensor for sensing accelerations, which sensor comprises:
    an accelerometer for measuring an acceleration,
    a magnetometer for measuring a magnetic field, and
    a processor for, in response to at least one acceleration measurement measured by the accelerometer and at least one magnetic field measurement measured by the magnetometer, judging the acceleration,
    the processor comprising:
        an acceleration unit for comparing the at least one acceleration measurement measured by the accelerometer with at least one acceleration threshold,
        a magnetic field unit for comparing at least one change of the at least one magnetic field measurement measured by the magnetometer per time interval with at least one rate threshold, and
        a decision unit for, in response to comparison results from the acceleration unit and the magnetic field unit, deciding whether a total acceleration forms part of a tumbling free-fall or a non-tumbling free-fall, wherein the decision unit is configured to decide that the total acceleration forms part of a non-tumbling free-fall if the deviation of the total acceleration from a fixed acceleration value is larger than a first threshold while the rate of change of each of the at least one magnetic field measurement is smaller than the at least one rate threshold and if the time integral of the deviation of the total acceleration is larger than a second threshold.

2. The sensor according to claim 1, the accelerometer comprising an at least two dimensional accelerometer for measuring the acceleration in at least two dimensions and for generating at least two acceleration signals per acceleration measurement.

3. The sensor according to claim 1, the magnetometer comprising an at least two dimensional magnetometer for measuring the magnetic field in at least two dimensions and for generating at least two magnetic field signals per magnetic field measurement.

4. The sensor according to claim 1, the processor further comprising:
    a control unit for, in response to at least one comparison result from the acceleration unit and/or the magnetic field unit, controlling a clock signal generator for generating a variable clock signal defining a variable bandwidth rate and/or a variable sampling rate.

5. A device comprising the sensor according to claim 1, the acceleration being the acceleration of the device.

6. The sensor of claim 1, wherein the decision unit is configured to decide that the total acceleration forms part of a tumbling free-fall if the at least one acceleration measurement measured by the accelerometer is larger than the at least one acceleration threshold and if the at least one change of the at least one magnetic field measurement measured by the magnetometer per time interval is larger than the at least one rate threshold.

7. A sensor for sensing accelerations, which sensor comprises:
    an accelerometer for measuring an acceleration,
    a magnetometer for measuring a magnetic field, and
    a processor for, in response to at least one acceleration measurement measured by the accelerometer and at least one magnetic field measurement measured by the magnetometer, judging the acceleration,
    the processor comprising:
        an acceleration unit for comparing the at least one acceleration measurement measured by the accelerometer with at least one acceleration threshold,
        a magnetic field unit for comparing at least one change of the at least one magnetic field measurement measured by the magnetometer per time interval with at least one rate threshold,
        a distinguishing unit for, in response to comparison results from the acceleration unit and the magnetic field unit, distinguishing a first acceleration in a first direction from a second acceleration in a second direction, and
        a decision unit for, in response to comparison results from the acceleration unit and the magnetic field unit, deciding whether a total acceleration of at least one of the first and second accelerations forms part of a tumbling free fall or a non-tumbling free-fall, wherein the decision unit is configured to decide that the total acceleration forms part of a non-tumbling free-fall if the deviation of the total acceleration from a fixed acceleration value is larger than a first threshold while the rate of change of each of the at least one magnetic field measurement is smaller than the at least one rate threshold and if the time integral of the deviation of the total acceleration is larger than a second threshold.

8. The sensor of claim 7, wherein the decision unit is configured to decide that the total acceleration forms part of a tumbling free-fall if the at least one acceleration measurement measured by the accelerometer is larger than the at least one acceleration threshold and if the at least one change of the at least one magnetic field s measurement measured by the magnetometer per time interval is larger than the at least one rate threshold.

9. A method for sensing accelerations, which method comprises the steps of:
    measuring an acceleration using an accelerometer,
    measuring a magnetic field using a magnetometer, and
    in response to at least one acceleration measurement measured by the accelerometer and at least one magnetic field measurement measured by the magnetometer, judging the acceleration using a processor,
    wherein judging the acceleration comprises:
        comparing the at least one acceleration measurement measured by the accelerometer with at least one acceleration threshold,
        comparing at least one change of the at least one magnetic field measurement measured by the magnetometer per time interval with at least one rate threshold, and
        in response to comparison results, deciding whether a total acceleration forms part of a tumbling free-fall or a non-tumbling free-fall, comprising deciding that the total acceleration forms part of a non-tumbling free-fall if the deviation of the total acceleration from a fixed acceleration value is larger than a first threshold while the rate of change of each of the at least one magnetic field measurement is smaller than the at least one rate threshold and if the time integral of the deviation of the total acceleration is larger than a second threshold.

10. A non-transitory computer readable medium containing computer instructions stored therein for causing a computer processor to perform steps of the method according to the claim 9.

11. The method of claim 9, wherein deciding whether the total acceleration forms part of a tumbling free-fall or a non-tumbling free-fall comprises deciding that the total acceleration forms part of a tumbling free-fall if the at least one acceleration measurement measured by the accelerometer is larger than the at least one acceleration threshold and if the at least one change of the at least one magnetic field measurement measured by the magnetometer per time interval is larger than the at least one rate threshold.

* * * * *